United States Patent [19]
Jeffries et al.

[11] Patent Number: 5,664,119
[45] Date of Patent: Sep. 2, 1997

[54] LOCAL PROACTIVE HOT SWAP REQUEST/ACKNOWLEDGE SYSTEM

[75] Inventors: Kenneth L. Jeffries, Leander; Craig S. Jones; Victor K. Pecone, both of Austin, all of Tex.

[73] Assignee: Dell USA, L.P., Austin, Tex.

[21] Appl. No.: 699,016

[22] Filed: Aug. 16, 1996

Related U.S. Application Data

[63] Continuation of Ser. No. 271,617, Jul. 7, 1994, Pat. No. 5,579,491.

[51] Int. Cl.$^6$ .................................................. G06F 13/00
[52] U.S. Cl. ................................. 395/283; 395/182.05
[58] Field of Search ............................. 395/283, 282, 395/281, 835, 182.05, 182.12, 653

[56] References Cited

U.S. PATENT DOCUMENTS

| | | | |
|---|---|---|---|
| 4,835,737 | 5/1989 | Herrig et al ........................... | 395/283 |
| 5,297,067 | 3/1994 | Blackborow et al. ................. | 395/309 |
| 5,310,998 | 5/1994 | Okuno ..................................... | 235/380 |
| 5,386,567 | 1/1995 | Lien et al. .............................. | 395/653 |
| 5,564,024 | 10/1996 | Pemberton ............................ | 395/283 |
| 5,572,685 | 11/1996 | Fisher et al. ........................... | 395/287 |
| 5,579,491 | 11/1996 | Jeffries et al. ......................... | 395/283 |

*Primary Examiner*—Glenn A. Auve
*Attorney, Agent, or Firm*—Haynes and Boone, L.L.P.

[57] ABSTRACT

Apparatus and method for implementing a local proactive hot plug request/acknowledge scheme is disclosed. In a preferred embodiment, each hot pluggable device installable on a computer bus, such as a SCSI bus, is provided with a physical user interface comprising a mechanical request initiator, such as a button or two-position switch, for allowing a user to generate a hot swap request to a controller associated with the bus prior to actual installation of the device on, or removal of the device from, the bus. Upon receipt of the request, the controller determines whether the requested action may be performed, provides a visual indication of its determination to the user via an LED on the user interface and, if installation or removal is determined to be prudent, performs the hot installation/removal in an orderly manner so as not to adversely affect ongoing system operations.

34 Claims, 4 Drawing Sheets

LOCAL PROACTIVE HOT SWAP REQUEST/ACKNOWLEDGE SYSTEM

This is a continuation of application Ser. No. 08/271,617 filed on Jul. 7, 1994 U.S. Pat. No. 5,579,491.

TECHNICAL FIELD

The invention relates generally to systems for enabling hot installation of peripheral devices on and hot removal of peripheral devices from a computer bus and, more specifically, to an apparatus and a method for implementing a local proactive hot swap request/acknowledge scheme.

BACKGROUND OF THE INVENTION

Numerous apparatuses and methods for enabling hot installation of peripheral devices, control circuits and power supplies on and hot removal of same from computer buses are known in the art. Historically, in order to minimize the potentially detrimental effects of plugging into a bus, the preferred procedure has been to shut down the bus, thereby preventing a newly installed device from disrupting data flow on the bus. In contrast, "hot plugging," or "hot swapping," methods provide both power and data transfer interconnections between a computer bus and a newly installed device without requiring power to be removed from the bus. Hot plugging is commonly implemented in fault tolerant computer systems, which normally employ device or field replaceable unit redundancy coupled with operational comparison and checking logic to ensure correct operation. When a fault is detected, an indication of the failing device is provided to service personnel, who then simply remove the failing device and install a replacement therefor. Such removal and installation procedures are performed without regard to bus activity; therefore, both the bus architecture and device electronics must be carefully designed to achieve such hot plugging capability.

In many hot plug schemes, there is no provision for indicating to the system that a drive is to be installed on or removed from the bus. In other words, a drive is simply installed or removed without first "consulting" with the system to determine whether such installation or removal will adversely affect the system. For example, a common prior art method of implementing hot pluggable small computer systems interface (SCSI) drive systems relies on a SCSI bus reset after a drive has already been removed or inserted. Such interface systems suffer several deficiencies.

For example, initiating a SCSI reset in response to the occurrence of a hot plug event causes a considerable time delay where the host operating system is stalled while waiting for data transactions to resume with the SCSI host adapter subsystem. This delay is believed to be unacceptable for certain operating systems. Furthermore, not providing an electrical power decoupling interface for each SCSI drive is considered by many skilled artisans to be electrically unreliable. SCSI drives monitor their +5 volt and +12 volt power forms and can reset themselves if a fault condition beyond their threshold range is detected. Electrically installing a SCSI drive causes a momentary power glitch which can appear to adjacent local physical drives as a power fault. In addition, removal of a drive that is not redundant, as well as removal of a drive during a diagnostics or configuration/maintenance program, will typically result in system failure. User error could easily result in such an action. Finally, electrically introducing a "bad" drive (i.e., one that fails normal inquiry and/or initialization) may also cause system failure.

Clearly, therefore, a priori knowledge that a device is about to be installed on or removed from an active bus would reduce system complexity and increase system reliability because such knowledge would (1) allow the system to determine how to deal with the additional or missing device and (2) enable the bus to be placed in a known electrical state prior to the electrical connection or disconnection of the device.

One known method of ameliorating the foregoing problems is to include in a computer system a proactive software interface, which enables the user to inform the system that a device is to be installed or removed prior to its respective installation or removal. Though such software interfaces do communicate a priori knowledge of the impending installation/removal of a device prior to the actual installation/removal, such software interfaces may not be implemented in many cases.

Therefore, what is needed is an apparatus and a method for implementing a fault tolerant hot swap request/acknowledge scheme for enabling hot swapping of a device on a computer bus without adversely affecting the integrity of the bus and/or the computer system.

SUMMARY OF THE INVENTION

The foregoing problems are solved and a technical advance is achieved by an apparatus and a method for implementing a local proactive hot plug request/acknowledge scheme. In a departure from the art, each hot pluggable device installable on a computer bus, such as a SCSI drive, is provided with a physical user interface comprising a mechanical request initiator, such as a button or two-position switch, which may be depressed or switched to generate a hot swap request to a controller associated with the bus prior to actual installation of the device on, or removal of the device from, the bus. Upon receipt of the request, the controller determines whether the hot swap may be performed, provides a visual indication of its determination via the user interface and, if installation or removal is not imprudent, performs the hot installation/removal in an orderly manner so as not to adversely affect system operations.

In one aspect of the invention, when a drive is to be installed onto an active bus, which installation is referred to as a "hot install," the drive is first physically connected to the bus and the associated user interface button is then depressed. Depression of the button generates a hot install request, in the form of an interrupt signal, and transmits the request to the controller. Upon receipt by the controller of the hot install request, the controller generates an acknowledge signal and transmits the signal to the user interface of the drive to cause an associated light emitting diode (LED) to flash on and off. In this manner, a visual indication that the hot install request has been received and is being processed is provided. The controller then determines whether the drive may be installed on the active bus. If the controller determines that the drive should not be installed on the active bus because, for example, the drive is defective or the host (not shown) is performing maintenance or diagnostics procedures, the controller turns the LED off and the drive remains uninstalled on the bus. Alternatively, if the controller determines that the drive may be installed on the bus, it signals this determination by illuminating the LED and installing the drive on the bus in an orderly manner.

In another aspect of the present invention, when a drive is to be removed, from the active bus, which removal is referred to as a "hot removal," the associated user interface button is depressed prior to physically, and thereby electrically, disconnecting the drive from the bus. Depression of the button generates a hot removal request, in the form of an interrupt signal to the controller. Upon receipt by the controller of the hot removal request, the controller generates an acknowledge signal to the user interface of the drive to cause the associated LED to flash on and off. In this manner, a visual indication that the hot removal request has been received and is being processed is provided. The controller then determines whether the drive may be removed from the active bus without adversely affecting system functions. If so, then the controller electrically disconnects the drive from the bus in an orderly manner. Once the drive is electrically disconnected from the bus, the controller generates a signal to the user interface to turn the LED off, indicating thereby that the drive may be physically disconnected therefrom.

A technical advantage achieved with the present invention is that it can determine whether a device to be removed from the bus is actually redundant and/or not critical to system operation. The results of the determination can also be indicated visually before such removal takes place.

Another technical advantage achieved with the present invention is that it can determine, before the installation of a device on the bus, whether the device is defective and will therefore be detrimental to the system. If the device is found defective, then installation can be prevented.

Another technical advantage achieved with the invention is that it provides a priori knowledge to the bus that a device is about to be removed or installed, thereby enabling the bus to be placed in a known state and a determination to be made as to how such installation or removal is to be dealt with.

A further technical advantage achieved with the invention is that it need not be implemented in a proprietary environment and may be implemented in a PC environment.

Still a further technical advantage achieved with the invention is that, in a SCSI drive system environment, it provides an electrical power decoupling interface for each SCSI drive.

DETAILED DESCRIPTION OF THE PREFERRED EMBODIMENT

Figure 1:
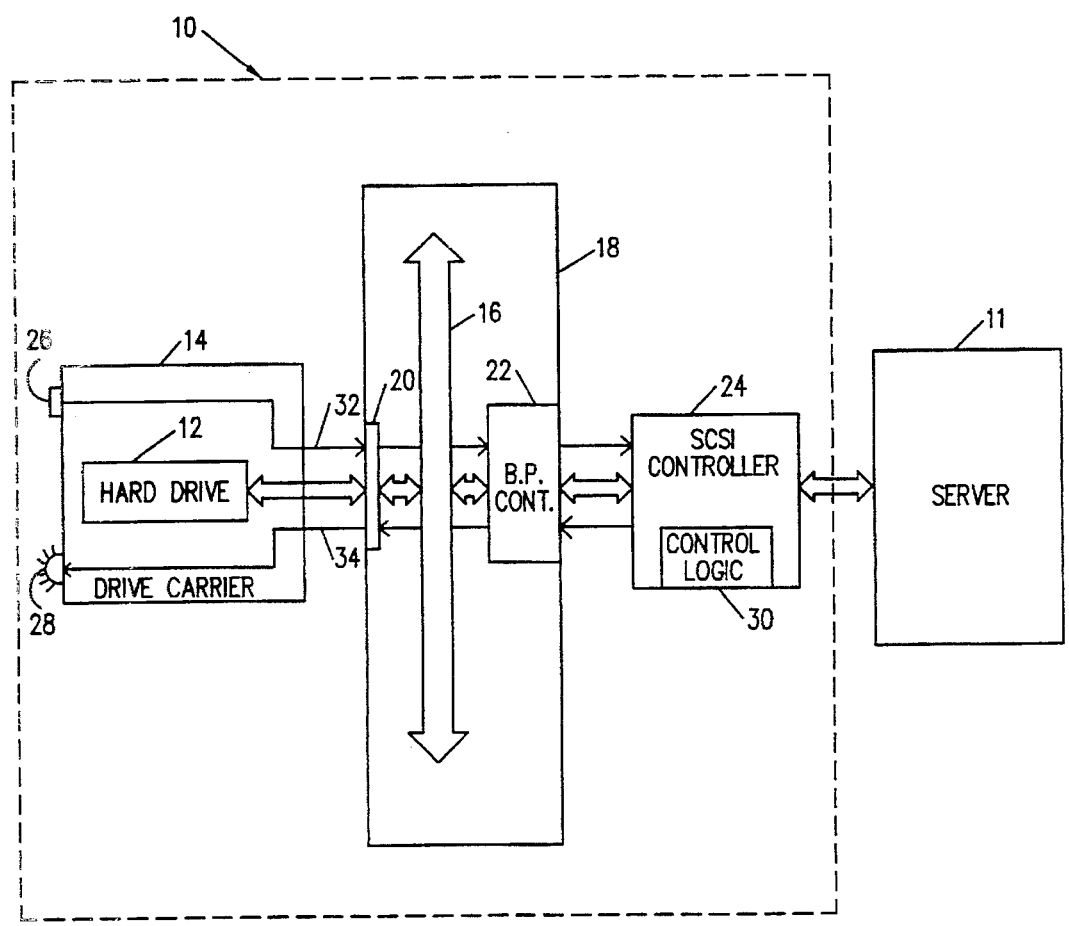
FIG. 1 is a schematic block diagram of a computer system embodying features of the present invention.

FIG. 1 is a schematic block diagram of a computer subsystem 10 embodying features of the present invention. The subsystem 10, which, for illustrative purposes is considered to be a SCSI drive subsystem, is connected to a main system 11, in this case a server. The subsystem 10 comprises at least one SCSI drive 12 contained within a mechanical drive carrier 14. In a preferred embodiment, the SCSI drive 12 is connectable to a SCSI bus 16, located on a SCSI backplane 18, via special complementary connectors (not shown) mounted on the carrier 14 and a drive bay 20, which bay 20 is electrically connectable to the bus 16. The bus 16 is further connected to the server 11 via a backplane controller 22 and a SCSI controller 24 for purposes that will subsequently be described in detail. In the preferred embodiment, the backplane controller 22 need only comprise sufficient intelligence to provide a control interface between the drive 12 and the SCSI controller 24. In accordance with a feature of the present invention, a user interface comprising a request initiator, such as a mechanical switch or button 26, and a visual indicator, such as a light emitting diode (LED) 28, associated with the SCSI drive 12 is mounted on the user-accessible front panel of the carrier 14.

Although for purposes of explanation, only one SCSI drive is shown in FIG. 1 as being connectable to the bus 16, it should be understood that a plurality of SCSI drives, each being contained in a mechanical drive carrier upon which is mounted a user interface, may be connected to the bus 16.

In one aspect of the present invention, when a user wants to install the SCSI drive 12 onto the bus 16 while the bus 16 is active (a "hot install"), the user first connects the carrier 14 to the bay 20 on the backplane 18 to physically connect the drive 12 to the bus 16 and then depresses the button 26 on the front panel of the carrier 14. Depression of the button 26 generates a hot install request, in the form of an interrupt signal, to the controller 24 via a line 32. Although not shown, it should be understood that debouncing and decoding of the interrupt signal may be performed by special circuitry on the backplane 18. Responsive to receipt of the hot install request, under the control of control logic 30 embodied therein, the SCSI controller 24 generates an acknowledge signal to the drive carrier 14, via a line 34, to cause the LED 28 to flash on and off. In this manner, a visual indication that the hot install request has been received and is being processed is provided to the user. As will be described in detail with reference to FIG. 2, the controller 24, again under the control of control logic 30, determines whether the drive 12 may be installed on the active bus 16. If the SCSI controller 24 determines that the drive 12 may not be installed on the active bus 16 because, for example, the drive 12 is defective or the host (not shown) is performing maintenance or diagnostics procedures, the SCSI controller 24 turns the LED 28 off, using signals on the line 34, and the bay 20 remains "cold." In other words, while the drive 12 may remain physically connected to the bus 16, it is not electrically connected thereto and hence cannot be communicated with. Alternatively, if the SCSI controller 24 determines that the drive 12 may be installed on the bus 16, it signals this determination to the user by illuminating the LED 28, using signals on the line 34, and then installs the drive 12 on the bus 16 in an orderly manner such that the subsystem 10 and host may communicate therewith, i.e., the bay 20 is "hot."

Similarly, in another aspect of the present invention, prior to removal of the drive 12 from the active bus 16 (a "hot removal"), the user depress the button 26 on the front panel of the carrier 14 prior to physically disconnecting the carrier 14 from the bay 20. Depression of the button 26 generates a hot removal request, in the form of an interrupt signal on the line 32, to the controller 24. Again, although not shown, it should be understood that debouncing and decoding of the interrupt signal may be performed by special circuitry on the backplane 18. Responsive to receipt of the hot removal request, the SCSI controller 24 generates an acknowledge signal to the drive carrier 14 via the line 34 to cause the LED 28 to flash on and off. In this manner, a visual indication that the hot removal request has been received and is being processed is provided to the user. As will be described in detail with reference to FIG. 3, under the control of the control logic 30, the SCSI controller 24 determines whether the drive 12 may be removed from the subsystem 11 without adversely affecting system 10 functions. If so, the SCSI controller 24 electrically disconnects the drive 12 from the active bus 16 in an orderly manner. Once the drive 12 is electrically disconnected, the SCSI controller 24 generates signals to the carrier 14 on the line 34 to turn the LED 28 off, indicating to the user that the bay is cold and the carrier 14 may be physically disconnected therefrom.

Figure 2:
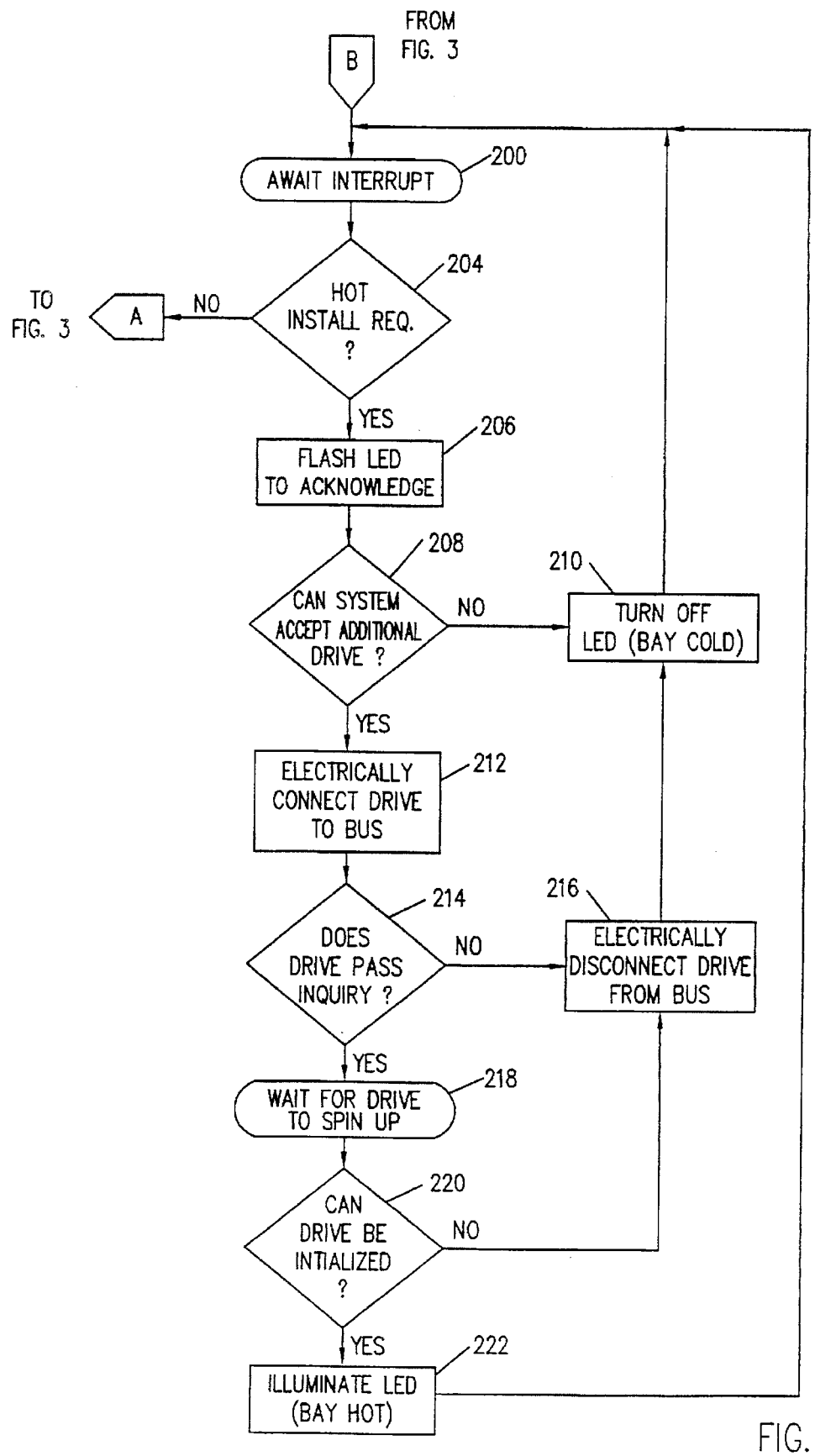
FIGS. 2 and 3 are flowcharts illustrating control logic for performing hot installation of a drive onto and hot removal of a drive from the system of FIG. 1.
Figure 3:
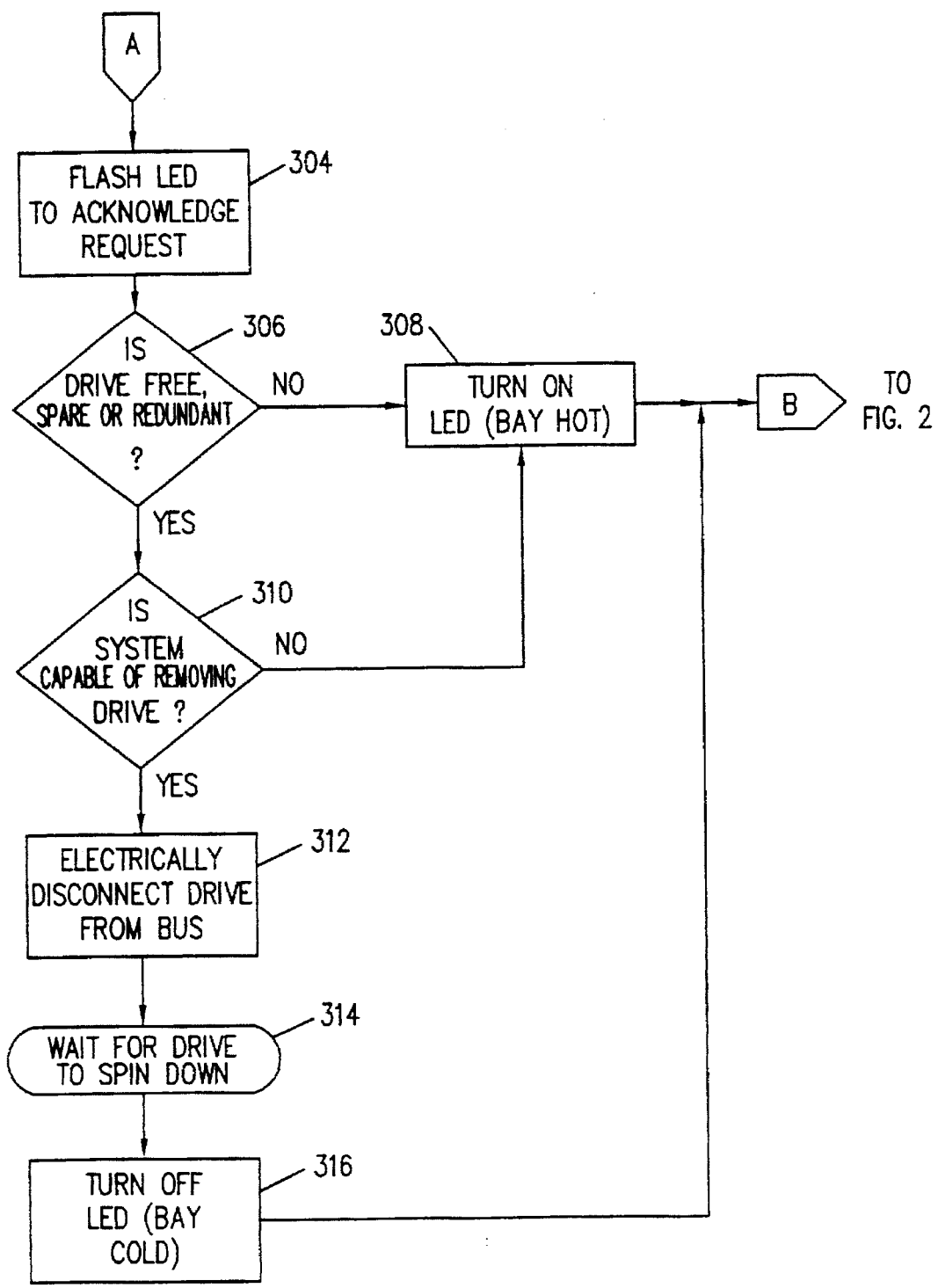

FIGS. 2 and 3 are flowcharts of control logic implemented by the SCSI controller 24 for performing hot installation and hot removal of the drive 12, respectively, in accordance with the present invention. In step 200, the controller awaits receipt of an interrupt from the carrier 14 on the line 32. As previously discussed, such an interrupt is generated when the button 26 is depressed to initiate a hot install/remove request. Upon receipt of an interrupt, execution proceeds to step 204, in which a determination is made whether the interrupt is a hot install request. If the interrupt is not a hot install request, i.e., it is a hot removal request, execution proceeds to step 304 (FIG. 3). Otherwise, execution proceeds to step 206, in which a signal is generated to the carrier 14 to cause the LED 28 to flash on and off to acknowledge receipt of the hot install request. In step 208, a determination is made whether the system 10 can accept an additional drive at the present time. If not, execution proceeds to step 210, in which the SCSI controller 24 turns the LED 28 off and the bay 20 remains cold, and then returns to step 200 to await additional interrupts. The fact that the system 10 is performing routine maintenance or diagnostics procedures, for example, may prevent it from being able to accept an additional drive.

If in step 208 it is determined that the system is capable of accepting an additional drive, execution proceeds to step 212, in which the drive 12 is electrically connected to the active bus 16. In step 214, a determination is made whether the drive 12 passes inquiry by the controller 24. Such inquiry typically includes at least a determination by the SCSI controller 24 as to physical parameters (such as the number of bytes or sectors) of the drive 12. If in step 214 it is determined that the drive 12 does not pass inquiry, execution proceeds to step 216, in which the drive 12 is electrically disconnected from the bus, and then to step 210, in which the LED 28 is turned off, indicating that the bay is cold. Finally, execution returns to step 200.

If in step 214 it is determined that the drive 12 does pass inquiry, execution proceeds to step 218, in which the SCSI controller 24 waits for the drive 12 to spin up, and then to step 220, in which a determination is made whether the drive 12 can be initialized. If in step 220 it is determined that the drive 12 cannot be initialized, e.g., it is defective, execution proceeds to step 216, in which the drive 12 is electrically disconnected from the active bus 16, and then to step 210, in which the LED 28 is turned off, indicating that the bay 20 is cold. Finally, execution returns to step 200.

If in step 220 it is determined that the drive 12 can be initialized, execution proceeds to step 222, in which the SCSI controller 24 changes the LED 28 from a flashing state to a continuous on state, indicating that the bay 20 is hot, and the drive 12 is installed on the active bus 16 in a known manner. Execution then returns to step 200.

If in step 204, it is determined that the interrupt is not a hot install request, i.e., it is a hot removal request, execution proceeds to step 304 (FIG. 3). In step 304, the SCSI controller 24 acknowledges receipt of the interrupt by flashing the LED 28. In step 306, a determination is made whether the drive 12 may be removed without adversely affecting the system 10, i.e., whether the drive is redundant, or a spare, or not in use. If in step 306 it is determined that the drive 12 is not redundant or a spare, execution proceeds to step 308, in which the controller illuminates the LED 28, indicating that the bay 20 is hot and that the carrier 14 should not be disconnected from the bay 20, and then returns to step 200.

If in step 306 it is determined that the drive is redundant or a spare, execution proceeds to step 310. In step 310, a determination is made whether the system 10 is capable of removing the drive 12. For example, the system 10 may be incapable of removing a drive while it is running a diagnostics or maintenance program. If in step 310 it is determined that the system 10 is not capable of removing a drive, execution proceeds to step 308, in which the SCSI controller 24 illuminates the LED 28, indicating that the bay is still hot and that the carrier 14 should not be disconnected from the bay 20, and then returns to step 200 (FIG. 2).

If in step 310 it is determined that the system 10 is capable of removing a drive, execution proceeds to step 312, in which the drive 12 is electrically disconnected from the bus 16. In step 314, the SCSI controller 24 waits for the drive 12 to spin down and then proceeds to step 316, in which the SCSI controller 24 turns off the LED 28 to indicate to the user that the bay 20 is cold and the drive 12 may be physically disconnected from the backplane 18. Execution then returns to step 200 (FIG. 2).

Figure 4:
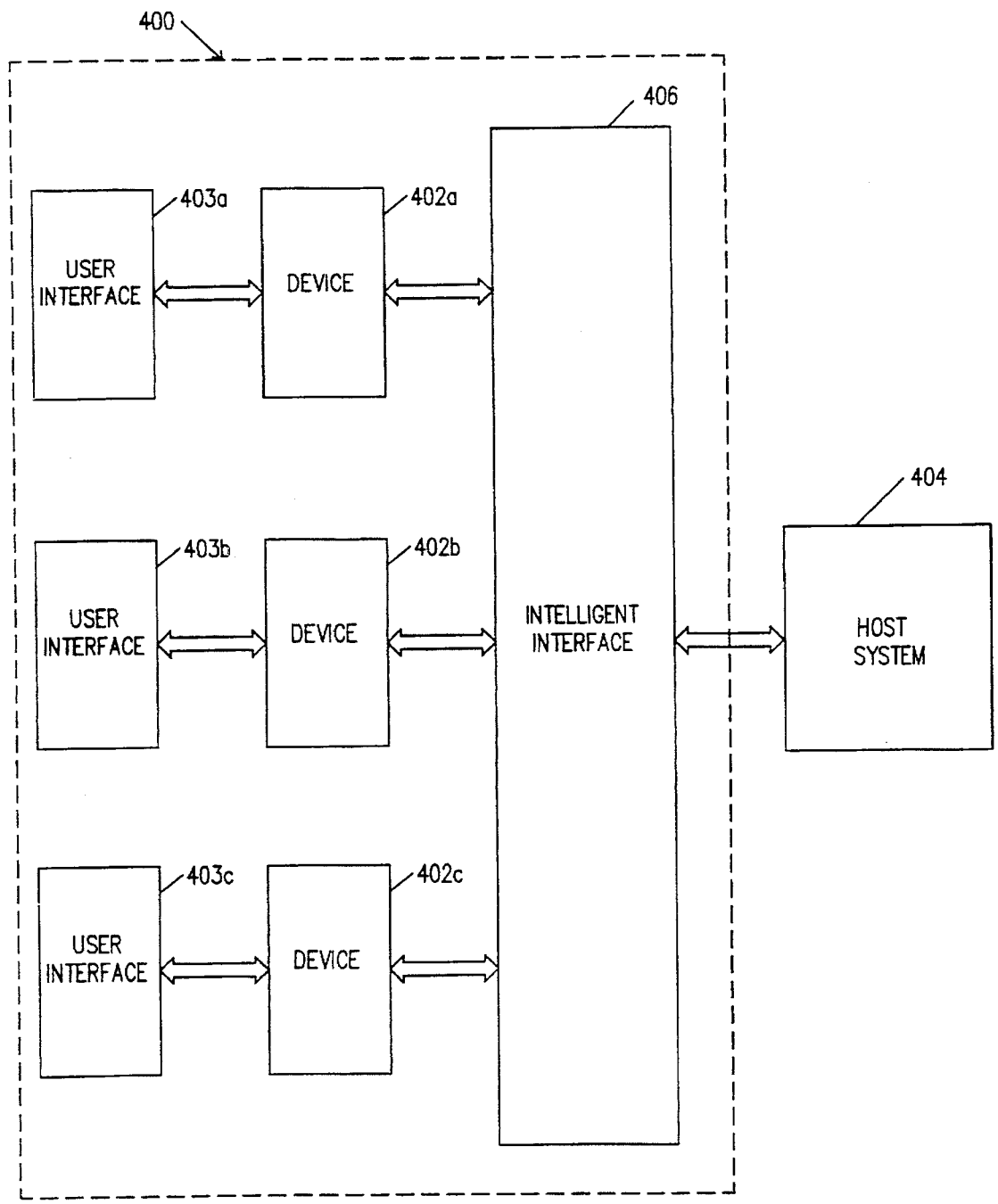
FIG. 4 is a schematic block diagram of an alternative embodiment of the system of FIG. 1.

Referring to FIG. 4, at the most basic level, the system of the present invention may be used for enabling the hot swapping of any type of storage, power supply, or peripheral devices which lend themselves to a redundant array. In FIG. 4, an alternative embodiment of the subsystem 10 of FIG. 1, designated by reference numeral 400, comprises an array of redundant devices 402a–402c, each including an associated a user interface 403a–403c and connected to a main, or host, system 404 via an intelligent interface 406. As previously indicated, the devices 402a–402c may comprise any number of types of storage, power supply or peripheral devices which lend themselves to a redundant array. Referring to both FIGS. 1 and 4, it should be clear that the combination of the button 26 and the LED 28 of FIG. 1 correspond to the user interfaces 403a–403c of FIG. 4, the SCSI drive 12 corresponds to the devices 402a–402c, the combination of the SCSI bus 16, SCSI backplane 18, backplane controller 22 and SCSI controller 24 of FIG. 1 correspond to the intelligent interface 406 of FIG. 4 and the server 11 of FIG. 1 corresponds to the host system 404 of FIG. 4.

Operation of the system shown in FIG. 4 is nearly identical to the operation of the system of FIG. 1, depending on the identity of the devices 402a–402c. For example, assuming a user wants to initiate a hot removal of the device 402b from the system 404, the user simply depresses a request initiator on the user interface 403b associated with the device 402b, responsive to which action the intelligent interface 406 determines whether the removal of the device 402b would disrupt system operations. The results of the determination of the intelligent interface 406 are then indicated to the user via a visual indicator on the associated user interface 403b, and, assuming that the interface 406 determines that removal would not disrupt system operations, the device 402b is electrically disconnected from the system 404 in an orderly manner.

Alternatively, assuming the user now wants to initiate a hot reinstallation of the device 402b, the user physically connects the device 402b to the interface 406 and then depresses the request initiator on the user interface 403b, responsive to which action, the interface 406 determines whether installation of the device is appropriate, substantially in accordance with the logic illustrated in FIG. 2.

It is understood that the present invention can take many forms and embodiments. The embodiments shown herein are intended to illustrate rather than to limit the invention, it being appreciated that variations may be made without departing from the spirit or the scope of the invention. For example, the subsystem 10 need not be a SCSI subsystem.

Furthermore, the SCSI drive 12 may comprise any other type of device, such as a redundant power supply. In addition, a visual indication means other than the LED 28 may be used, or an indication means other than a visual indication means, e.g., an audio indication means, such as a tone or an alarm, may be used.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. Apparatus for implementing a local proactive hot swap request/acknowledge scheme in a computer system comprising a computer bus and a plurality of electrical devices each including a carrier, each device being physically and electrically connectable to said bus, the apparatus comprising:

each of said carriers of said electrical devices including a user-actuatable means supported thereon for generating a request for a hot swap procedure in connection with said electrical devices comprising a hot installation or a hot removal of said electrical devices;

processor means electrically connected to each of said user-actuatable means, for processing said hot swap request to determine whether said requested hot swap procedure may be performed without detrimentally affecting ongoing operations of said bus and said system, and for generating signals indicative of results of said processing;

each of said carriers of said electrical devices including an indicating means supported thereon and electrically connected to said processor means, for indicating said processing results to a user, said indicating means being responsive to receipt of said generated signals from said processor means; and means connected to said processor means for performing said requested hot swap procedure when said processor means determines that said requested hot swap procedure may be performed.

2. The apparatus of claim 1 wherein each of said indicating means provides a visual indication signal.

3. The apparatus of claim 1 wherein each of said indicating means provides an audio indication signal.

4. The apparatus of claim 1 wherein each of said electrical devices is a power supply.

5. The apparatus of claim 1 wherein each of said electrical devices is a memory device.

6. The apparatus of claim 1 wherein said bus is a small computer systems interface (SCSI) bus.

7. The apparatus of claim 6 wherein said processor means is a SCSI controller.

8. The apparatus of claim 1 wherein each of said electrical devices is a SCSI drive.

9. The apparatus of claim 1 wherein said means for performing said requested hot swap procedure is a backplane controller.

10. The apparatus of claim 1 wherein, responsive to receipt of said hot swap request, said processor means generates and transmits signals to said indicating means for causing said indicating means to provide an acknowledgment signal to said user.

11. The apparatus of claim 1 wherein each of said indicating means comprises a light emitting diode (LED), and wherein, responsive to receipt of said hot swap request, said processor means generates signals to said LED for causing said LED to flash on and off during said processing.

12. The apparatus of claim 1 further comprising:

logic, executable by said processor means, for determining whether said system can accept an additional electrical device;

logic, executable by said processor means in response to a determination that said system can accept an additional electrical device, for causing said performing means to electrically connect said additional electrical device to said bus;

logic, executable by said processor means, for determining whether said additional electrical device passes inquiry regarding a parameter of said device;

logic, executable by said processor means in response to a determination that said additional electrical device passes inquiry, for determining whether said additional electrical device can be initialized; and logic, executable by said processor means in response to a determination that said additional electrical device can be initialized, for causing said performing means to install said additional electrical device on said bus, and for causing said indicating means to provide a first indication signal to said user.

13. The apparatus of claim 12 further comprising:

logic, executable by said processor means in response to a determination that said system cannot accept an additional electrical device, for preventing said performing means from installing said additional electrical device on said bus, and for causing said indicating means to provide a second indication signal to said user;

logic, executable by said processor means in response to a failure in determination of said parameters of said additional electrical device, for electrically disconnecting said additional electrical device from said bus, and for preventing said performing means from installing said additional electrical device on said bus, and for causing said indicating means to provide said second indication signal to said user; and logic, executable by said processor means in response to a determination that said additional electrical device cannot be initialized, for electrically disconnecting said additional electrical device from said bus, and for preventing said means for performing from installing said additional electrical device on said bus, and for causing said indicating means to provide said second indication signal to said user.

14. The apparatus of claim 13 wherein each of said indicating means is a light emitting diode (LED), and wherein said first indication signal comprises turning said LED on and said second indication signal comprises turning said LED off.

15. A method for implementing a local proactive hot swap request/acknowledge scheme in a computer system comprising a plurality of electrical devices connectable to a computer bus, each of said electrical devices including a carrier having associated therewith and supported thereon a respective user actuatable means for generating a hot swap request associated with said electrical devices the method comprising:

generating a hot swap request using said user-actuatable means to request hot installation of said electrical devices on, or hot removal of said electrical devices from said bus;

responsive to receipt of said hot swap request, processing said hot swap request to determine whether said requested installation or removal may be performed without detrimentally affecting ongoing operations of said bus and said system;

providing an indication via an indicator on the carrier of said determination to a user; and responsive to the determination that said requested installation or removal may be performed, performing said requested installation or removal.

16. The method of claim 15 wherein said hot swap request is a hot installation request, the method further comprising, prior to said generating, physically connecting said electrical devices to said bus.

17. The method of claim 15 wherein said hot swap request is a hot removal request, the method further comprising, responsive to a determination that said requested removal may be performed, physically disconnecting said electrical devices from said bus.

18. The method of claim 15 further comprising, responsive to receipt of said hot swap request, providing an indication of said hot swap request receipt to said user.

19. The method of claim 18 wherein each of said electrical devices further includes a light emitting diode (LED) associated therewith and wherein said indication of said hot swap request receipt comprises flashing said LED during said processing.

20. The method of claim 15 wherein said hot swap request is a hot installation request and said determining whether said requested installation or removal may be performed further comprises:

determining whether said system can accept an additional electrical device;

responsive to a determination that said system can accept an additional electrical device, electrically connecting said additional electrical device to said bus;

determining parameters of said additional electrical device;

responsive to a determination of said parameters of said additional electrical device, determining whether said additional electrical device can be initialized; and responsive to a determination that said additional electrical device can be initialized, determining that said additional electrical device can be installed on said bus.

21. The method of claim 20 wherein said determining whether said requested installation or removal may be performed further comprises, responsive to a determination that said system cannot accept an additional electrical device, determining that said requested installation cannot be performed.

22. The method of claim 20 wherein said determining whether said requested installation or removal may be performed further comprises, responsive to a determination that said associated electrical device cannot be initialized, electrically disconnecting said associated electrical device from said bus and determining that said requested installation cannot be performed.

23. Apparatus for implementing a local proactive hot swap request/acknowledge scheme in a computer system comprising a computer bus and a plurality of electrical devices, each device including a carrier and being physically and electrically connectable to said bus, the apparatus comprising:

each of said carriers of said electrical devices including a user-actuatable mechanical request initiator supported thereon, for generating a request for a hot swap procedure comprising a hot installation or a hot removal of said electrical devices;

a processor electrically connected to each of said request initiators, for processing said hot swap request to determine whether said requested hot swap procedure may be performed without detrimentally affecting ongoing operations of said bus and said system, and for generating signals indicative of said processing results;

each of said carriers of said electrical devices including an indicator physically supported thereon and electrically connected to said processor for indicating said processing results to a user, said indications being responsive to receipt of said generated signals from said processor; and a backplane controller connected to said processor for performing said requested hot swap procedure when said processor determines that said requested hot swap procedure may be performed.

24. The apparatus of claim 23 wherein each of said indicators provides a visual indication signal.

25. The apparatus of claim 23 wherein each of said indicators provides an audio indication signal.

26. The apparatus of claim 23 wherein each of said at least one electrical devices is a power supply.

27. The apparatus of claim 23 wherein each of said at least one electrical devices is a memory device.

28. The apparatus of claim 23 wherein said bus is a small computer systems interface (SCSI) bus.

29. The apparatus of claim 28 wherein said processor is a SCSI controller.

30. The apparatus of claim 28 wherein each of said electrical devices is a SCSI drive.

31. The apparatus of claim 23 wherein, responsive to receipt of said hot swap request, said processor generates and transmits signals to said indicator for causing said indicator to provide an acknowledgment signal to said user.

32. The apparatus of claim 23 wherein each of said indicators comprises a light emitting diode (LED), and wherein, responsive to receipt of said hot swap request, said processor generates signals to cause said LED to flash on and off during said processing.

33. The apparatus of claim 23 further comprising:

logic, executable by said processor, for determining whether a parameter of said system can accept an additional electrical device;

logic, executable by said processor in response to a determination that said system can accept an additional electrical device, for causing said controller to electrically connect said additional electrical device to said bus;

logic, executable by said processor, for determining whether said additional electrical device can be initialized; and logic, executable by said processor in response to a determination that said additional electrical device can be initialized, for causing said controller to install said additional electrical device on said bus, and for causing said indicator to provide a first indication signal to said user.

34. The apparatus of claim 33 further comprising:

logic, executable by said processor in response to a determination that said system cannot accept an additional electrical device, for preventing said controller from installing said additional electrical device on said bus, and for causing said indicator to provide a second indication signal to said user;

logic, executable by said processor, for electrically disconnecting said additional electrical device from said bus, for preventing said controller from installing said additional electrical device on said bus, and for causing said indicator to provide said second indication signal to said user; and logic, executable by said processor in response to a determination that said additional electrical device cannot be initialized, for electrically disconnecting said additional electrical device from said bus, for preventing said controller from installing said additional electrical device on said bus, and for causing said indicator to provide said second indication signal to said user.

* * * * *